US005472773A

United States Patent [19]

Misuda et al.

[11] Patent Number: 5,472,773

[45] Date of Patent: Dec. 5, 1995

[54] COATED PAPER AND PROCESSES FOR ITS PRODUCTION

[75] Inventors: Katsutoshi Misuda; Nobuyuki Yokota, both of Yokohama, Japan

[73] Assignee: Asahi Glass Company Ltd., Tokyo, Japan

[21] Appl. No.: 265,334

[22] Filed: Jun. 24, 1994

[30] Foreign Application Priority Data

Jun. 25, 1993 [JP] Japan .................................. 5-180685

[51] Int. Cl.[6] .................................................. B32B 3/00

[52] U.S. Cl. ..................... 428/195; 428/304.4; 428/331; 428/342; 428/454; 428/537.5; 428/914

[58] Field of Search .................................. 428/195, 212, 428/206, 304.4, 329, 331, 537.5, 342, 454, 914

[56] References Cited

U.S. PATENT DOCUMENTS

| | | | |
|---|---|---|---|
| 4,879,166 | 11/1989 | Misuda et al. | 428/212 |
| 5,104,730 | 4/1992 | Misuda et al. | 428/304.4 |
| 5,264,275 | 11/1993 | Misuda et al. | 428/304.4 |
| 5,275,867 | 1/1994 | Misuda et al. | 428/195 |

OTHER PUBLICATIONS

Database, JP–A–59 078925, May 8, 1984.

*Primary Examiner*—Patrick J. Ryna
*Assistant Examiner*—William A. Krynski
*Attorney, Agent, or Firm*—Oblon, Spivak, McClelland, Maier, & Neustadt

[57] ABSTRACT

A coated paper comprising a paper substrate and a pseudo-boehmite layer formed on the substrate, wherein said pseudo-boehmite layer has a specular glossiness at 60° of at least 30% as measured in accordance with JIS Z8741.

7 Claims, No Drawings

COATED PAPER AND PROCESSES FOR ITS PRODUCTION

The present invention relates to a coated paper and processes for its production.

In recent years, along with wide spread use of electron still cameras or computers, technology for hard copies has rapidly been developed to record the images on paper sheets or the like. The ultimate goal of such hard copies is silver halide photography, and especially, it is an object of the development to bring the color reproduction, image density, gloss, weather resistance, etc. as close as those of silver halide photography. For the recording system of hard copies, not only a method of directly photographing a display on which an image is shown by silver halide photography, but also various systems such as a sublimation type heat transfer system, an ink jet system and an electrostatic transfer system, are known. Ink jet system printers have been widely used in recent years, since full coloring is thereby easy, and printing noise is little. The ink jet system is designed to eject ink droplets from nozzles at a high speed to the recording sheet, and the ink contains a large amount of a solvent. Therefore, the recording sheet for an ink jet printer is required to quickly absorb the ink and yet have an excellent color-forming property. For example, a recording sheet is known which has a porous layer of alumina hydrate formed on a substrate (U.S. Pat. No. 5,104,730). Further, when a recording sheet for an ink jet printer is required to have a gloss, glossy paper having an ink-absorbing layer of a resin type formed on a substrate, is also known.

In the ink jet recording system, the ink contains a large amount of a solvent to prevent clogging of the nozzle. Therefore, there has been a problem that after printing, the ink-absorbing layer tends to undergo swelling by the influence of the solvent, and especially in the case of an ink-absorbing layer of a resin type, glossiness tends to deteriorate.

It is an object of the present invention to provide a coated paper which has an excellent ink-absorbing property, a high color reproduction property and an excellent surface gloss.

Thus, the present invention provides a coated paper comprising a paper substrate and a pseudo-boehmite layer formed on the substrate, wherein said pseudo-boehmite layer has a specular glossiness at 60° of at least 30% as measured in accordance with JIS Z8741.

The present invention also provides a process for producing a coated paper, which comprises coating a coating solution of pseudo-boehmite on a smooth die surface, closely contacting a paper substrate thereon, followed by drying to form a pseudo-boehmite layer, and then peeling off the paper substrate from the die so that the pseudo-boehmite layer is transferred onto the paper substrate.

Further, the present invention provides a process for producing a coated paper, which comprises coating a coating solution of pseudo-boehmite on a paper substrate to form a pseudo-boehmite layer and then pressing a heated smooth die to the pseudo-boehmite layer to smooth the surface.

Now, the present invention will be described in detail with reference to the preferred embodiments.

The specular glossiness at 60° is the one prescribed in method 3 in JIS Z8741. This method corresponds to the method prescribed in ISO 2813. In the coated paper of the present invention, the specular glossiness at 60° is more preferably at least 40%.

In the coated paper of the present invention, the pseudo-boehmite layer is a colloidal aggregate of crystals of boehmite ($Al_2O_3.nH_2O$, n is from 1 to 1.5). It preferably contains a binder. With respect to the pore characteristics, it is preferred that the average pore radius is from 3 to 15 nm, and the pore volume is within a range of from 0.5 to 1.0 cc/g.

As the pseudo-boehmite layer, the coated amount is preferably within a range of from 5 to 30 g/m$^2$. If the coated amount is less than 5 g/m$^2$, the ink absorbing property tends to be low, or the gloss is likely to be poor due to the influence of the surface roughness of the substrate, such being undesirable. If the coated amount exceeds 30 g/m$^2$, not only the pseudo-boehmite is unnecessarily consumed but also the strength of the pseudo-boehmite layer is likely to be low, such being undesirable.

The paper as the substrate is not particularly limited, and various types of paper may be employed. It is also possible to use a paper containing a loading material other than the pseudo-boehmite. The loading material may internally be loaded or may be formed in a layer beneath the pseudo-boehmite layer. The loading material is not particularly limited, but it is preferred to use silica, since its absorbing property is excellent. When silica is to be used, it is preferred that the pore radius is from 4 to 25 nm, and the pore volume is from 0.8 to 2.5 cc/g. In such a case, the coated amount of silica is preferably within a range of from 5 to 10 g/m$^2$.

The coated paper of the present invention can be produced by coating a coating solution of pseudo-boehmite on a smooth die surface, then closely contacting a paper substrate thereon, followed by drying to form a pseudo-boehmite layer, and then peeling off the paper substrate from the die so that the pseudo-boehmite layer is transferred onto the paper substrate. The material of the die to be used here, is not particularly limited and may, for example, be a plastic such as polyethylene terephthalate or polycarbonate, or a metal. With respect to the shape of the die, not only a flat plate type but also a roll type or flexible film type die can be used so long as the surface is smooth.

Here, the term "coating solution" may include the form of sol, dispersion liquid and slurry.

A coating solution of solid boehmite will be coated on this die. The composition of the coating solution of solid boehmite may be such that a binder is contained preferably in an amount of from 5 to 50 parts by weight per 100 parts by weight of the solid content of solid-boehmite, and the total solid concentration is from 5 to 30 wt %. The solvent of the coating solution is preferably water-type from the viewpoint of handling efficiency. As the binder, an organic binder made of a polymer compound such as starch or its modified product, polyvinyl alcohol or its modified product, SBR latex, NBR latex, carboxyl methyl cellulose, hydroxymethyl cellulose, or polyvinyl pyrrolidone, may be preferably used.

The method for coating the coating solution to the die is not particularly limited, and various methods may be employed. After coating the coating solution on the die, it is preferred to adjust the water content by drying. In this coated film, the water content (water/solid content) is preferably adjusted to a level of from 200 to 400 parts by weight.

A paper substrate will be closely contacted to the coating solution layer thus adjusted. The paper substrate may be the one having a silica-coated layer preliminarily formed thereon. In such a case, it is closely contacted so that the silica-coated layer side will be in contact with the above-mentioned coating solution layer. Then, the contacted assembly is subjected to drying, and when the water content in the psuedo-boehmite-coated layer becomes not more than 5 wt %, the substrate is peeled off from the die, whereby the pseudo-boehmite layer will be transferred to the paper substrate.

The process of the present invention may be conducted not only by a batch system but also by a continuous system employing a rotatable roll-shaped die.

The coated paper of the present invention may also be produced by coating a coating solution of pseudo-boehmite on a paper substrate to form a pseudo-boehmite layer thereon and then pressing a heated smooth die on the pseudo-boehmite layer to smooth the surface.

Here, the coating solution of pseudo-boehmite may be similar to the one described above. The coating method is also not particularly limited, and various methods may be employed. At the time of pressing the die, it is preferred that the solvent is not completely removed from the pseudo-boehmite layer. When the coated layer is excessively dried, it is advisable to apply a solvent to the coated layer, for example, by spraying before pressing the die to the coated layer. The amount of the solvent at that time is usually preferably from 30 to 200 wt % relative to the solid content of the coated layer.

When the die is not heated, it takes time for smoothing, or the pseudo-boehmite layer is likely to break. Therefore, it is necessary to preliminarily heat the die to a temperature of from 50° to 150° C. As the die, various types such as a flat plate type and a roll type may be used, and the material thereof is not particularly limited.

Now, the present invention will be described in further detail with reference to Examples. However, it should be understood that the present invention is by no means restricted by such specific Examples.

EXAMPLE 1

To 100 parts by weight (solid content) of a boehmite sol with the aggregate particle diameter of sol particles being 150 nm, 13 parts by weight of polyvinyl alcohol was added, and water was further added to prepare a coating solution having a solid content concentration of 15 wt %. This coating solution was coated on a polyethylene terephthalate (PET) film having a thickness of 100 μm by means of bar coater so that the coated amount would be 15 g/m$^2$ as calculated as the solid content. The water content (water/solid content) immediately after the coating was 566%. The coated layer was dried, whereby the water content decreased to 350%.

On this coated surface, paper having a basis weight of 100 g/m$^2$ was closely contacted, followed by drying until the water content in the coated layer became 5 wt %. Then, the PET film was peeled off, whereby the coated layer was completely transferred to the paper to obtain a coated paper.

The specular glossiness at 60° of this coated paper was measured by Gloss Meter 300A manufactured by Nippon Denshoku Kogyo and found to be 42.2. Further, it was subjected to simple color solid printing and two-color, three-color or four-color wet-on-wet solid printing by means of a color ink jet printer employing four-color inks, whereupon the glossiness of the printed portions was measured in the same manner. The results were 46%, 45%, 43% and 44%, respectively.

EXAMPLE 2

To 100 parts by weight of a silica gel powder having an average particle diameter of 3 μm (Carplex FPS3, manufactured by Shionogi Pharmaceutical Company Ltd.), 14 parts by weight of polyvinyl alcohol was added, and water was further added to obtain a coating solution of silica having a solid content concentration of 12 wt %. This coating solution of silica was coated on a coated paper having a basis weight of 80 g/m$^2$ by means of a bar coater so that the coated amount would be 8 g/m$^2$ as calculated as the solid content, followed by drying to obtain a base paper.

Then, to 100 parts by weight (solid content) of a boehmite sol with the aggregate particle diameter of sol particles being 150 nm, 13 parts by weight of polyvinyl alcohol was added, and water was further added to obtain a coating solution having a solid content concentration of 15 wt %. This coating solution was coated on a polycarbonate film having a thickness of 100 μm by means of a bar coater, so that the coated amount would be 15 g/m$^2$ as calculated as a solid content. The water content (water/solid content) immediately after the coating was 566%. The coated layer was dried, whereby the water content decreased to 375%.

To this coated surface, the silica-coated side of the above-mentioned coated paper was closely contacted, followed by drying until the water content of the coated layer became 5%. Then, the polycarbonate film was peeled off, whereby the coated layer was completely transferred to the paper. The specular glossiness at 60° of this coated paper was 41.0%.

EXAMPLE 3

A coating solution prepared in the same manner as in Example 1 was coated on a high quality paper having a basis weight of 150 g/m$^2$ by means of a bar coater so that the coated amount would be 20 g/m$^2$ as calculated as a solid content, followed by drying by 80° C.

To this coated surface, 100 parts by weight of water per 100 parts by weight of the solid content was applied, and a chromium-plated smooth iron plate heated to 80° C. was closely contacted thereto and left to stand, whereupon the paper was naturally peeled, whereby a glossy coated paper was obtained. The specular glossiness at 60° of the coated paper was 41.3%.

According to the processes of the present invention, a coated paper having an excellent ink absorbing property, a high color reproduction property and an excellent surface gloss can be obtained. Even if this coated paper is subjected to printing by an ink jet printer, the glossiness will not change.

What is claimed is:

1. A coated paper comprising a paper substrate and a pseudo-boehmite layer formed on at least one side of the substrate, wherein said pseudo-boehmite layer has a specular glossiness of at 60° of at least 30% as measured in accordance with JIS Z8741.

2. The coated paper according to claim 1, wherein the coated amount of pseudo-boehmite is from 5 to 30 g/m$^2$.

3. The coated paper according to claim 1, wherein the average pore radius of pseudo-boehmite is from 3 to 15 nm and the pore volume is from 0.5 to 1.0 cc/g.

4. The coated paper according to claim 1, which has a porous layer of silica having a pore volume of from 0.8 to 2.5 cc/g beneath the pseudo-boehmite layer.

5. The coated paper according to claim 4, wherein the coated amount of silica is from 5 to 10 g/m$^2$.

6. The coated paper according to claim 4, wherein the average pore radius of silica is from 4 to 25 nm.

7. The coated paper according to claim 1, wherein the pseudo-boehmite layer is formed on one side of the substrate.

* * * * *